United States Patent [19]

Ikizyan

[11] Patent Number: 5,995,038
[45] Date of Patent: Nov. 30, 1999

[54] WAKE FILTER FOR FALSE ALARM SUPPRESSION AND TRACKING

[75] Inventor: Ike A. Ikizyan, Irvine, Calif.

[73] Assignee: TRW Inc., Redondo Beach, Calif.

[21] Appl. No.: 09/013,800

[22] Filed: Jan. 26, 1998

[51] Int. Cl.[6] ........................................... G01S 7/34
[52] U.S. Cl. ............................ 342/91; 342/96; 342/159; 342/162
[58] Field of Search ................... 342/96, 89, 90, 342/91, 93, 159, 160, 162

[56] References Cited

U.S. PATENT DOCUMENTS

| | | | |
|---|---|---|---|
| 3,670,331 | 6/1972 | Rittenbach | 342/157 |
| 3,680,100 | 7/1972 | Woerrlein | 342/13 |
| 3,702,986 | 11/1972 | Taylor et al. | 395/800.25 |
| 3,858,206 | 12/1974 | Scheidler et al. | 342/83 |
| 4,347,513 | 8/1982 | Schindler | 342/13 |
| 4,542,382 | 9/1985 | Hol | 342/91 |
| 5,311,187 | 5/1994 | Garside | 342/59 |
| 5,341,142 | 8/1994 | Reis et al. | 342/64 |
| 5,432,889 | 7/1995 | Ekchian et al. | 395/21 |
| 5,450,345 | 9/1995 | Raymer et al. | 364/453 |
| 5,546,084 | 8/1996 | Hindman | 342/25 |
| 5,570,094 | 10/1996 | Armstrong | 342/107 |

OTHER PUBLICATIONS

"Search Radar Detection and Track with the Hough Transform Part I: System Concept" by B.C. Carlson, E.D. Evans and S.L. Wilson,—*IEEE Transactions on Aerospace and Electronic System*, vol. 30, No. 1, Jan. 1994, pp. 102–108.

"Search Radar Detection and Track with the Hough Transform Part II: Detection Statistics", by B.D. Carlson, E.D. Evans and S.L. Wilson, *IEEE Transactions on Aerospace and Electronic Systems*, vol. 30, No. 1, Jan. 1994, pp. 109–115.

"Search Radar Detection and Track with the Hough Transform Part III: Detection Performance with Binary Integration", by B.D. Carlson, E.D. Evans and S.L. Wilson, *IEEE Transactions on Aerospace and Electronic Systems*, Vol. 30, No. 1, Jan. 1994, pp. 116–125.

*Primary Examiner*—John B. Sotomayor
*Attorney, Agent, or Firm*—MIchael S. Yatsko

[57] ABSTRACT

A processing technique suitable for use with a search radar system which minimizes the false detection of targets. Rather than rely on a predetermined target trajectory, such as a straight line trajectory in range time space, the processing technique in accordance with the present invention is not based on a target dynamics model. The system in accordance with the present invention relies on past detections and assigns a confidence level to detections which are in the wake of a previous detection. A wake function is used to determine the amount by which each detection recursively accrues confidence based on a limited record of past detections. A detection is declared when the confidence level exceeds a predetermined threshold. As detections are encountered in range time space, such detections are used to form wakes based on the wake function which are used to assign confidence levels for future detections.

22 Claims, 2 Drawing Sheets

WAKE FILTER FOR FALSE ALARM SUPPRESSION AND TRACKING

BACKGROUND OF THE INVENTION

1. Field of the Invention

The present invention relates to an imaging filter and more particularly to an imaging filter for use with a search radar system which detects and tracks various targets including moving targets while suppressing false detection without relying on a straight line trajectory of the target.

2. Description of the Prior Art

Various imaging systems are known and used in a wide variety of applications. For example, search radar systems are known for imaging targets in a particular region of interest. Examples of such search radar systems are disclosed in U.S. Pat. Nos. 3,670,331; 3,680,100; 4,542,382 and 5,311,187; hereby incorporated by reference. Such search radar systems normally include a phased array antenna system or a mechanically rotatable antenna which sweeps a predetermined region of interest. The search radar systems are used for detecting and tracking various targets including moving targets and provide the range, azimuth and elevation of such targets in the predetermined region of interest as a function of time.

An important consideration in such search radar systems is the ability to suppress false detections. In general, radar systems including search radar systems normally compare the radiation reflected back to the radar system to a predetermined threshold. Reflected radiation having an energy level greater than the threshold is assumed to be reflected from a target and displayed or further processed. In order to further enhance the ability to detect and track moving targets and suppress noise, various other techniques have been developed. For example, "SEARCH RADAR DETECTION AND TRACK WITH THE HOUGH TRANSFORM PART I: SYSTEM CONCEPT", by B. D. Carlson, E. D. Evans and S L. Wilson,—*IEEE Transactions on Aerospace and Electronics Systems,* Vol. 30, No. 1, January 1994, pgs. 102–108; "SEARCH RADAR DETECTION AND TRACK WITH THE HOUGH TRANSFORM PART II: DETECTION STATISTICS", by B. D. Carlson, E. D. Evans and S. L. Wilson, *IEEE Transactions on Aerospace and Electronics Systems,* Vol. 30, No. 1, January 1994, pgs. 109–115, and "SEARCH RADAR DETECTION AND TRACK WITH THE HOUGH TRANSFORM PART III: DETECTION PERFORMANCE WITH BINARY INTEGRATION", by B. D. Carlson, E. D. Evans and S. L. Wilson, *IEEE Transactions on Aerospace and Electronics Systems,* Vol. 30, No. 1, January 1994, pgs. 116–125 disclose a processing technique in which the target trajectories are modeled as straight lines or low order polynomial curves. Any reflected radar energy greater than a threshold is then transformed into a parameter space where voting takes place based upon the expected straight line trajectory of the target. The parameters that receive the most votes are considered to represent the actual targets. Unfortunately, such a processing technique does not apply to target trajectories which do not fit the polynomial used as the model. For example, accurate tracking of people in a cluttered ground environment would produce erratic trajectories which would not fit such a model. As such, the processing technique as discussed in the above mentioned articles has limited utility.

SUMMARY OF THE INVENTION

It is an objective of the present invention to solve various problems in the prior art.

It is yet another objective of the present invention to provide a processing technique for improving the detection of targets, for example, in a search radar system.

It is a further objective of the present invention to provide a system for minimizing false detections of targets for use with a search radar system.

Briefly, the present invention relates to a processing technique suitable for use with a search radar system which minimizes the false detection of targets. Rather than rely on a predetermined target trajectory, such as a straight line trajectory in range time space, the processing technique in accordance with the present invention is not based on a target dynamics model. The system in accordance with the present invention relies on past detections and assigns a confidence level to detections which are in the wake of a previous detection in range time space. A wake function is used to determine the amount by which each detection recursively accrues confidence based on a limited record of past detections. A detection is declared when the confidence level exceeds a predetermined threshold. As detections are encountered in range time space, such detections are used to form the wake functions which are used to assign confidence levels for future detections.

DESCRIPTION OF THE DRAWINGS

These and other objects of the present invention will be readily understood with reference to the following specification and attached drawing, wherein.

DETAILED DESCRIPTION

The present invention relates to a processing technique for use with various ranging and tracking systems. Although the processing technique is described and illustrated with respect to a search radar system, the principles of the present invention are applicable to various types of ranging systems.

As mentioned above, prior processing techniques for search radar systems assume a specific trajectory model, such as a straight line trajectory or low order polynomial model. As mentioned above, such a processing technique has only limited utility and is not useful in situations where the trajectory of the target is erratic. The processing technique in accordance with the present invention does not rely at all on a model for the trajectory of the target. Rather, the processing technique in accordance with the present invention relies on past detections and assigns a confidence level to detections which land in the wake of previous detections, stored in a finite length event list. A wake function is used to assign the amount by which each detection recursively accrues confidence based on limited record of past detections. A detection is declared as a true detection when the confidence level exceeds a given threshold.

Figure 1:
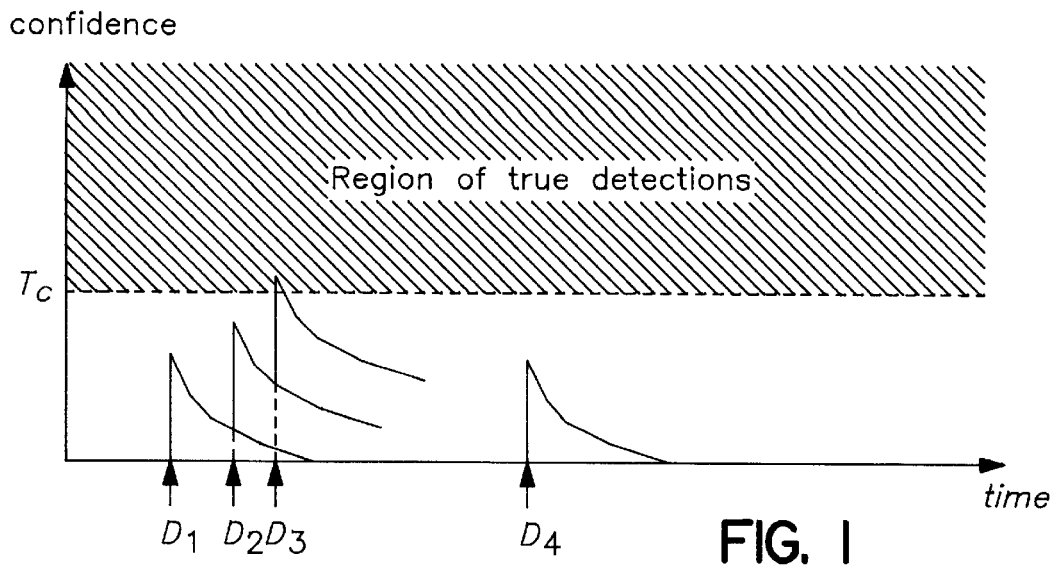
FIG. 1 is a graphical illustration for a single range bin illustrating how a detection gains confidence by landing in the wake of previous detection.

In accordance with the present invention, a wake function is used to assign confidence levels to future detections. FIG. 1 illustrates an exemplary, simplified, one dimensional, non-linear wake function where detections are assumed to be correlated if they occur relatively close in time. More particularly, FIG. 1 illustrates a simplified one dimensional example illustrating how confidence is gained by detections landing in the wakes in previous detections. This example effectively illustrates a single cross-section of range time space over a single range bin containing multiple detections. As shown, the detections are identified with the variables $D_1$, $D_2$, $D_3$ and $D_4$. As illustrated, after an initial detection $D_1$, subsequent correlated detections are elevated by a plateau created by the highest confidence level among all previous detections in the events list. Thus, detections $D_2$ and $D_3$, which occur relatively close in time to the detection $D_1$ are each elevated in confidence level. The region above the horizontal line identified as $T_c$ represents the threshold of confidence for true detection. As shown in FIG. 1, only one detection $D_3$ is above the threshold $T_c$ because of its proximity time with the detections $D_1$ and $D_2$, thus having gained enough confidence to represent a true detection. However, the detection $D_4$ does not gain any confidence from the detections $D_1$, $D_2$ and $D_3$ because it is too separated in time (uncorrelated) from the previous detections.

The example illustrated in FIG. 1 is used merely to illustrate the invention. However, the wake function in accordance with the present invention, as will be discussed in more detail below, may be a function of two discrete variables and stored as a two dimensional array in a memory and addressed by two indices, such as the range and time differences between a new detection and a past detection stored in an event list. If more than one detection from the event list supports the new detection, then only the larger contribution may be used.

Figure 2A:
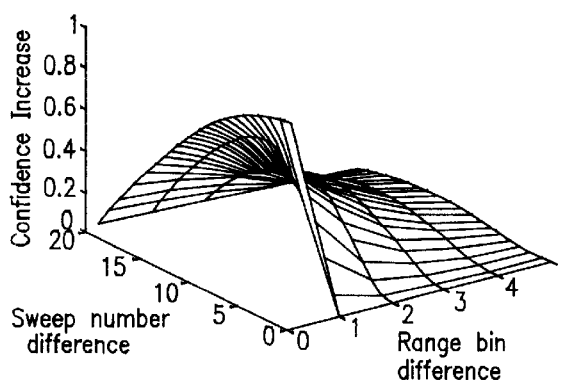
FIG. 2A is a graphical illustration of a symmetric right half of a wake function geometry as a function of bin distance and time distance between two close detections in range time space.
Figure 2B:
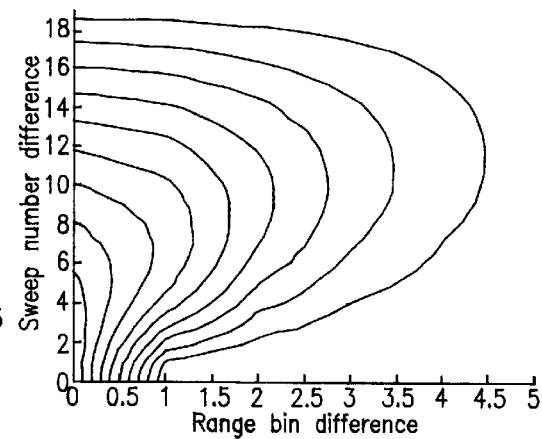
FIG. 2B is a contour map illustrating the contour lines of a symmetric right half of a wake function in accordance with the present invention.

Another important aspect of the invention is the symmetry with respect to the wake function. Since the wake function is symmetric with respect to the range, only one half of the wake function need be stored in electronic memory as illustrated in FIGS. 2A and 2B. In particular, FIG. 2A illustrates a graphical illustration of the symmetric right half of an exemplary wake function in accordance with the present invention as a function of bin distance and time distance between two close detections in range time space. The preferred embodiment of the wake function can be described in equation form as:

$$w(r, t) = \cos\left(\frac{\pi}{2}r\right)\cos\left(\frac{\pi}{2}t\right)\left[\frac{1 - \cos(2\alpha)}{2}\right] \quad (1)$$

where $\alpha = \tan^{-1}(t/r)$,
$0 < r \leq 1$,
$0 \leq t \leq 1$

While the indices of range and time are normalized to unity in this equation, they can be scaled individually to suit the application. FIG. 2B illustrates an exemplary contour map illustrating the contour lines of the symmetric right half of the wake function in accordance with the present invention.

Figure 2C:
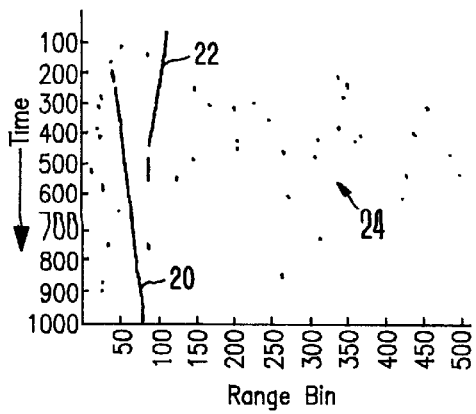
FIG. 2C is a graphical illustration which illustrates the preliminary detection space showing the range time coordinates of two real moving objects along with false detections.
Figure 2D:
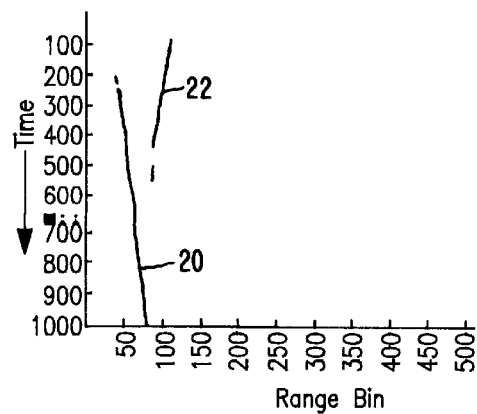
FIG. 2D illustrates the effect of the wake function in accordance with present invention which shows the suppression of false detections while preserving the tracks of two true targets as illustrated in FIG. 2C.

The effects of the processing technique in accordance with the present invention which utilizes a wake function to form a wake filter is illustrated in FIGS. 2C and 2D. FIG. 2C illustrates the preliminary detection space showing range time coordinates of two real moving objects represented by lines 20 and 22 along with false detections illustrated by the various dots generally identified by the reference numeral 24. In accordance with the present invention, the wake filter is able to suppress the false detections while preserving the tracks of the two targets as generally illustrated in 2D.

Figure 3:
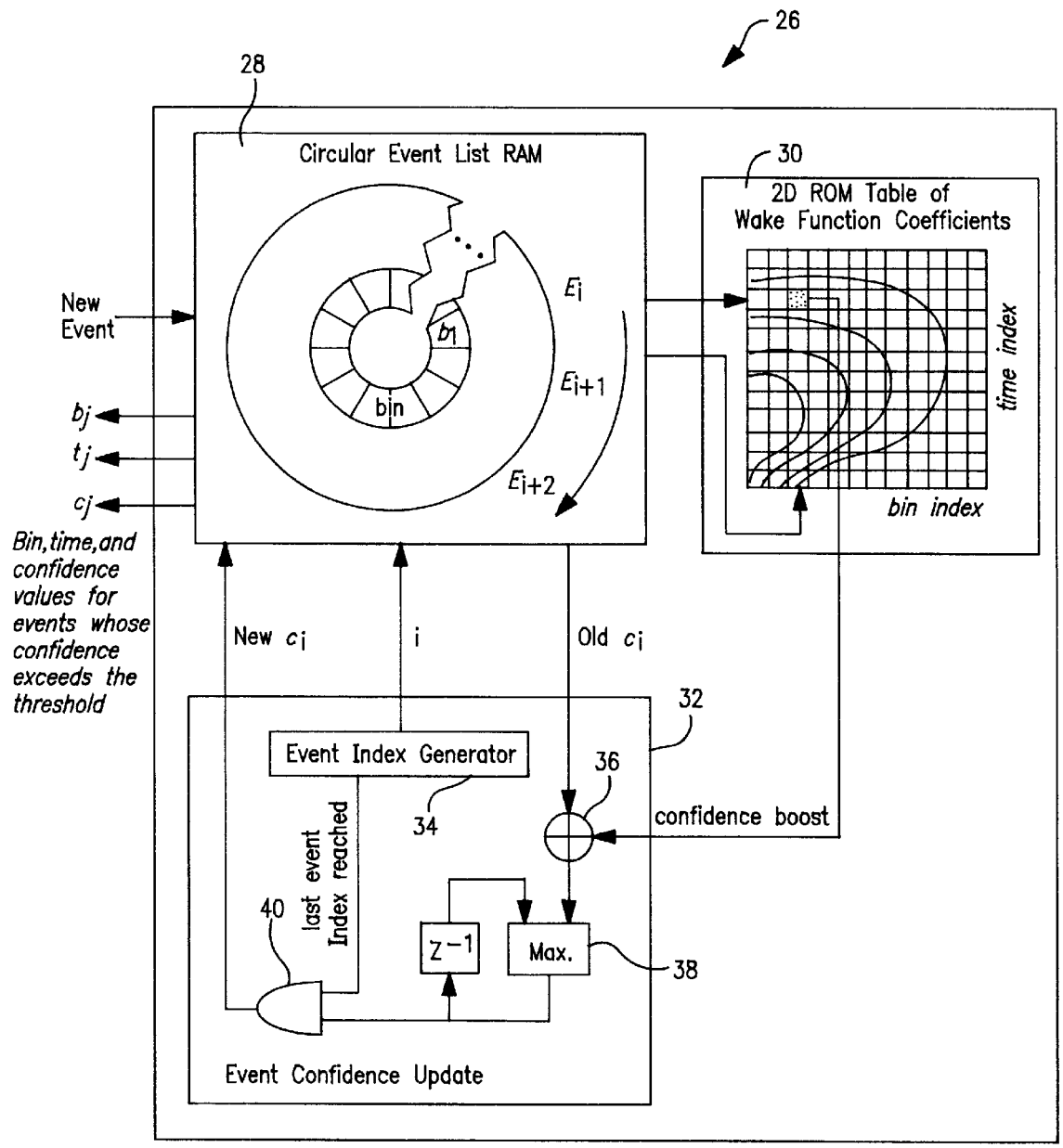
FIG. 3 is a block diagram illustrating a tracking correlator in accordance with the present invention.

FIG. 3 illustrates a block diagram of a tracking correlator which acts as a wake filter in accordance with the present invention. As will be discussed in more detail below, the wake filter, generally identified with the reference numeral 26, is used in part to form a finite memory of past detections to determine whether a new detection is real or simply a manifestation of noise, ground clutter, or the like. The wake filter 26 in accordance with the present invention includes a circular event list random access memory (RAM) 28, a two dimensional table of wake function coefficients stored in a read only memory (ROM) 30 and an event confidence update module 32. After each sweep of the search radar, the system 26 provides a list of indices for the range bin $b_j$ corresponding to discrete distances for targets of interest. The range bin indices for the new detection are stored in the RAM 28 which may be configured as a circular buffer in the order of range bin value from smallest to largest in a first in and first out (FIFO) basis. As new events are stored in the buffer 28, the oldest events are replaced allowing the size of the buffer to remain constant. At any point in time, the event list contains a list of most recent events; the number of events stored in the buffer 28 depending on the size of the RAM. The circular event list RAM 28 maintains a time stamp, range index and a confidence level for each event. At each cycle, the information in the event list is updated. In particular, the time stamp is incremented by one to indicate the number of sweeps that have occurred since the sweep containing the event.

When new events are applied to the filter 26, each event may be assigned an initial confidence value before being entered into the event list. The confidence value is computed for each new detection or event. In particular, one by one, the events in the event list are compare d to the new event to determine if the prior events can contribute additional confidence or support the new event which may be assigned a nominal initial confidence, for example one. An event index generator 34 begins by producing the index of the last event entered and successfully generates the index of the previously entered events until the event list is exhausted. With each index, the event list 28 returns the bin index value and confidence level associated with the past event. The absolute value of the difference in bin index values between a new event and the past event, combined with the past event's time stamp, provides the two values needed to look up the confidence boost from the wake function array stored in the ROM 30. Specifically, the two indices represent the row and column number which addresses the values stored in the wake function coefficient table, a two dimensional sampling of the function illustrated in FIGS. 2A and 2B. This value corresponds to a confidence boost and is added to the old confidence level by way of the summing junction 36. As the event index generator 34 scans through past events, the system keeps track of the largest value that the sum has achieved, as represented by the block 38 for the new event. When the last past event is reached, an AND gate 40 allows the value to be recorded or stored in the event list as the event's terminal confidence value. The process continues until all new events are assigned a confidence value. New events, whose confidence values exceed a threshold are determined to be true targets at the output of the filter 26.

In an alternate embodiment of the invention, the processing may be accelerated. In particular a technique may be employed which terminates the event index generator 34 during the processing of a new event if it reaches a past event whose time index exceeds the number of rows in the wake function coefficient table. This technique would prevent the consideration of past events that in no way can contribute a higher confidence value than what has been achieved thus far.

The present invention is particularly suitable to any type of detection and tracking system where the target dynamics are not known before hand. Examples of such systems include radar, motion estimation/compensation for video compression and edge tracking in digital images. When the dynamics of the target are known a priori, other techniques such as Kalman filtering are known to be optimal. However, in various practical applications, systems must be able to perform with a relatively wide range of dynamics without sacrificing performance.

Obviously, many modifications and variations of the present invention are possible in light of the above teachings. Thus, it is to be understood that, within the scope of the appended claims, the invention may be practiced otherwise than as specifically described above.

What is desired to be claimed by a Letters Patent is:

1. A system for optimizing detection in a radar system;
   means for storing detections of targets;
   means for assigning a confidence boost to such detections as a predetermined function of previous detections to generate new event signals;
   means for comparing said new event signals with a predetermined threshold and indicating a true detection when said new event signals exceeds said threshold.

2. The system as recited in claim 1, wherein said predetermined function is a non-linear function.

3. The system as recited in claim 2, wherein said non-linear function is a function of one or more indices.

4. The system as recited in claim 3, wherein one of said indices is range bin $b_j$.

5. The system as recited in claim 3 wherein one of said indices is time $t_j$.

6. The system as recited in claim 2, wherein said function is a wake function.

7. A process for optimizing detection in a radar process, comprising the steps of:
   (a) storing detection of targets;
   (b) assigning a confidence boost to such detections as a predetermined function of previous detections to generate new event signals;
   (c) comparing said new event signals with a predetermined threshold and indicating true detection when said new event exceeds said threshold.

8. The process as recited in claim 1, wherein said predetermined function is a non-linear function.

9. The process as recited in claim 2, wherein said non-linear function is a function of one or more indices.

10. The process as recited in claim 3, wherein one of said indices is range bin $b_j$.

11. The process as recited in claim 3 wherein one of said indices is time $t_j$.

12. The process as recited in claim 2, wherein said function is a wake function.

13. A system for minimizing false detections of a radar system, the system comprising:
    a random access memory (RAM) for storing range bin $b_j$ and time $t_j$ indices for new detection signals;
    a read only memory for storing a non-linear function accessible by one or more of said indices and generating a confidence boost as a predetermined function of previous detections; and
    means for adding said confidence boost to said new detection signals.

14. The system as recited in claim 13 further including means for generating an initial confidence level to each new detection signal.

15. The system as recited in claim 14, wherein said generating means includes means for comparing each new detection signal with prior detection signals.

16. The system as recited in claim 15 wherein said comparing means includes means for comparing the range bin index $b_j$ for each new detection signal with the range bin indices $b_j$ of previous detection signals and generating an absolute value signal for each previous detection signal.

17. The system as recited in claim 16, further including means for storing said absolute value signals and determining the maximum absolute signal for all previous detection signals currently stored in said RAM and said new detection signal.

18. The system as recited in claim 17, further including means for storing the confidence level for each new detection signal in said RAM.

19. A process for minimizing false detections of a radar system, the system comprising:
    (a) storing the range bin index $b_j$ for each new detection signal in a random access memory;
    (b) comparing the range bin index $b_j$ for each new detection signal with previously stored detection signals;
    (c) determining the maximum absolute value of the difference between said new detection signal and each of said previously stored detection signals;
    (d) adding a confidence boost signal to said new detection signal as a function of said maximum value.

20. The process as recited in claim 19 further including the step of adding an initial confidence signal to each new detection signal.

21. The process as recited in claim 19, further including the steps of storing said new detection signal and said confidence boost signal.

22. The process as recited in claim 21, wherein each new detection signal stored replaces the oldest detection signal stored.

* * * * *